US006301682B1

(12) United States Patent
Knefel

(10) Patent No.: US 6,301,682 B1
(45) Date of Patent: Oct. 9, 2001

(54) ERROR RECOGNITION IN A STORAGE SYSTEM

(75) Inventor: Hans-Werner Knefel, Martinsried (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/242,047

(22) PCT Filed: Aug. 6, 1997

(86) PCT No.: PCT/DE97/01656

§ 371 Date: Feb. 8, 1999

§ 102(e) Date: Feb. 8, 1999

(87) PCT Pub. No.: WO98/09218

PCT Pub. Date: Mar. 5, 1998

(30) Foreign Application Priority Data

Aug. 30, 1996 (DE) .............................................. 196 35 240

(51) Int. Cl.[7] .................................................... H03M 13/00
(52) U.S. Cl. ........................ 714/752; 714/759; 714/763
(58) Field of Search .................................. 714/752, 746, 714/753, 757, 758, 764, 766, 759, 723, 785, 763, 767, 768, 772

(56) References Cited

U.S. PATENT DOCUMENTS

| 4,821,254 | | 4/1989 | Satoh et al. . | |
|---|---|---|---|---|
| 5,173,905 | | 12/1992 | Parkinson . | |
| 5,182,752 | * | 1/1993 | DeRoo et al. | 714/758 |
| 5,331,645 | * | 7/1994 | Miller et al. | 714/785 |
| 5,357,529 | * | 10/1994 | Tatosian et al. | 714/723 |
| 5,491,700 | * | 2/1996 | Wright et al. | 714/759 |
| 5,550,849 | * | 8/1996 | Harrington | 714/752 |

FOREIGN PATENT DOCUMENTS

| 33 19 710 A1 | 6/1984 | (DE) . |
|---|---|---|
| 35 28 902 A1 | 6/1986 | (DE) . |
| 35 28 902 C2 | 6/1986 | (DE) . |
| 0 323 030 A2 | 5/1989 | (EP) . |

OTHER PUBLICATIONS

IBM Technical Disclosure bulletin, vol. 34 No. 3, Aug. 1991, Memory Of Address Fault Detection In Embedded Memory, pp. 139–140.

* cited by examiner

*Primary Examiner*—Albert Decady
*Assistant Examiner*—Emeka J. Amanze
(74) *Attorney, Agent, or Firm*—Schiff Hardin & Waite

(57) ABSTRACT

The data contents of memory systems are usually protected via an EDC system. When an error is present in the memory system, the EDC system can only recognize this error after the readout of faulty data. A memory system, wherein a respective check word is co-stored together with a data word, comprising: an error monitoring system that generates said check word from a data word to be written in and from a write address according to a predetermined formation rule, the formation rule being an EDC code before the check word in common with the data word to be written in is stored under said write address, and that generates a check word anew according to the EDC code based on a data word to be read out from the memory system, compares bits of the check word to K-bits stored for the data word and, given inequality, draws conclusions about a type of error from a pattern of equal and unequal K-bits, what is referred to as the syndrome pattern; and an internal read event that is implemented before storing a data word to be written under its write address, whereby the error monitoring system implements the error check according to feature b).

3 Claims, 5 Drawing Sheets respectively housed in a x4 - organized DRAM module

FIG 1

DTW1

|    | 00 | 01 | 02 | 03 | 04 | 05 | 06 | 07 | 08 | 09 | 10 | 11 | 12 | 13 | 14 | 15 |
|----|----|----|----|----|----|----|----|----|----|----|----|----|----|----|----|----|
| 0  |    |    | X  | X  |    | X  | X  | X  | X  | X  |    |    |    |    | X  |    |
| 0  |    | X  | X  | X  | X  | X  | X  |    |    | X  | X  | X  | X  | X  |    |    |
| E  | X  |    | X  | X  |    | X  |    |    | X  | X  |    | X  |    | X  | X  | X  |
| E  | X  | X  | X  | X  | X  | X  |    |    |    |    |    | X  |    |    |    | X  |
| 0  |    | X  | X  |    | X  |    |    |    |    | X  |    |    | X  |    |    |    |
| 0  | X  | X  |    |    | X  | X  |    | X  |    |    | X  |    |    | X  |    |    |
| 0  |    | X  |    | X  |    |    | X  |    | X  |    |    | X  | X  |    |    | X  |
| 0  |    |    |    |    | X  |    |    |    |    |    |    |    |    |    |    |    |

DTW2

|    | 16 | 17 | 18 | 19 | 20 | 21 | 22 | 23 | 24 | 25 | 26 | 27 | 28 | 29 | 30 | 31 |    |
|----|----|----|----|----|----|----|----|----|----|----|----|----|----|----|----|----|----|
|    |    | X  | X  |    | X  |    |    |    |    | X  |    |    |    | X  |    |    | C0 |
|    | X  | X  |    |    | X  | X  |    | X  |    |    | X  |    |    |    | X  |    | C1 |
|    |    | X  |    | X  |    |    | X  |    | X  |    |    | X  | X  |    |    | X  | C2 |
|    |    |    |    |    | X  |    |    |    |    |    |    |    |    |    |    |    | C3 |
|    |    |    | X  | X  |    | X  | X  | X  | X  | X  |    |    |    | X  |    |    | C4 |
|    |    | X  | X  | X  | X  | X  |    |    |    | X  |    | X  | X  | X  | X  |    | C5 |
|    | X  |    | X  | X  |    | X  |    | X  | X  |    | X  |    | X  | X  |    | X  | C6 |
|    | X  | X  | X  | X  | X  |    |    |    |    |    | X  |    |    |    |    | X  | C7 |

KWT1: C0–C3
KWT2: C4–C7 respectively housed in a x4 - organized DRAM module

FIG 2

Monitoring of the CMY - internal address paths (Address half) Word half 0

|   | 00 | 01 | 02 | 03 | 04 | 05 | 06 | 07 | 08 | 09 | 10 | 11 | 12 | 13 | 14 | 15 |    |
|---|----|----|----|----|----|----|----|----|----|----|----|----|----|----|----|----|----|
| O |    |    |    |    |    | X  | X  | X  | X  | X  |    |    |    |    | X  |    | C0 |
| O |    |    |    |    | X  | X  | X  |    |    | X  | X  | X  | X  | X  | X  |    | C1 |
| E |    |    |    |    |    | X  |    | X  | X  |    |    | X  |    | X  | X  |    | X  | C2 |
| E |    |    |    |    | X  | X  |    |    |    |    |    |    | X  |    |    | X  | C3 |
|   |    |    |    |    |    |    |    |    |    |    |    |    |    |    |    |    | C4 |
|   |    |    |    |    |    |    |    |    |    |    |    |    |    |    |    |    | C5 |
|   |    |    |    |    |    |    |    |    |    |    |    |    |    |    |    |    | C6 |
|   |    |    |    |    |    |    |    |    |    |    |    |    |    |    |    |    | C7 |

(Address half) Word half 1

|   | 16 | 17 | 18 | 19 | 20 | 21 | 22 | 23 | 24 | 25 | 26 | 27 | 28 | 29 | 30 | 31 |    |
|---|----|----|----|----|----|----|----|----|----|----|----|----|----|----|----|----|----|
|   |    |    |    |    |    |    |    |    |    |    |    |    |    |    |    |    | C0 |
|   |    |    |    |    |    |    |    |    |    |    |    |    |    |    |    |    | C1 |
|   |    |    |    |    |    |    |    |    |    |    |    |    |    |    |    |    | C2 |
|   |    |    |    |    |    |    |    |    |    |    |    |    |    |    |    |    | C3 |
| O |    |    | X  | X  |    | X  | X  | X  | X  | X  |    |    |    | X  |    |    | C4 |
| O |    | X  | X  | X  | X  | X  | X  |    |    | X  | X  | X  | X  | X  |    |    | C5 |
| O | X  |    | X  | X  |    | X  |    | X  | X  |    | X  |    | X  | X  |    | X  | C6 |
| O | X  | X  | X  | X  | X  | X  |    |    |    |    | X  |    |    |    | X  |    | C7 |

'O' next to the lines means the following:
If the number of 'ones' included in the associated address part is odd, the allocated parity bit = 1!

"E' next to the lines means the following:
If the number of 'ones' included in the associated address part is odd, the allocated parity bit = 0!

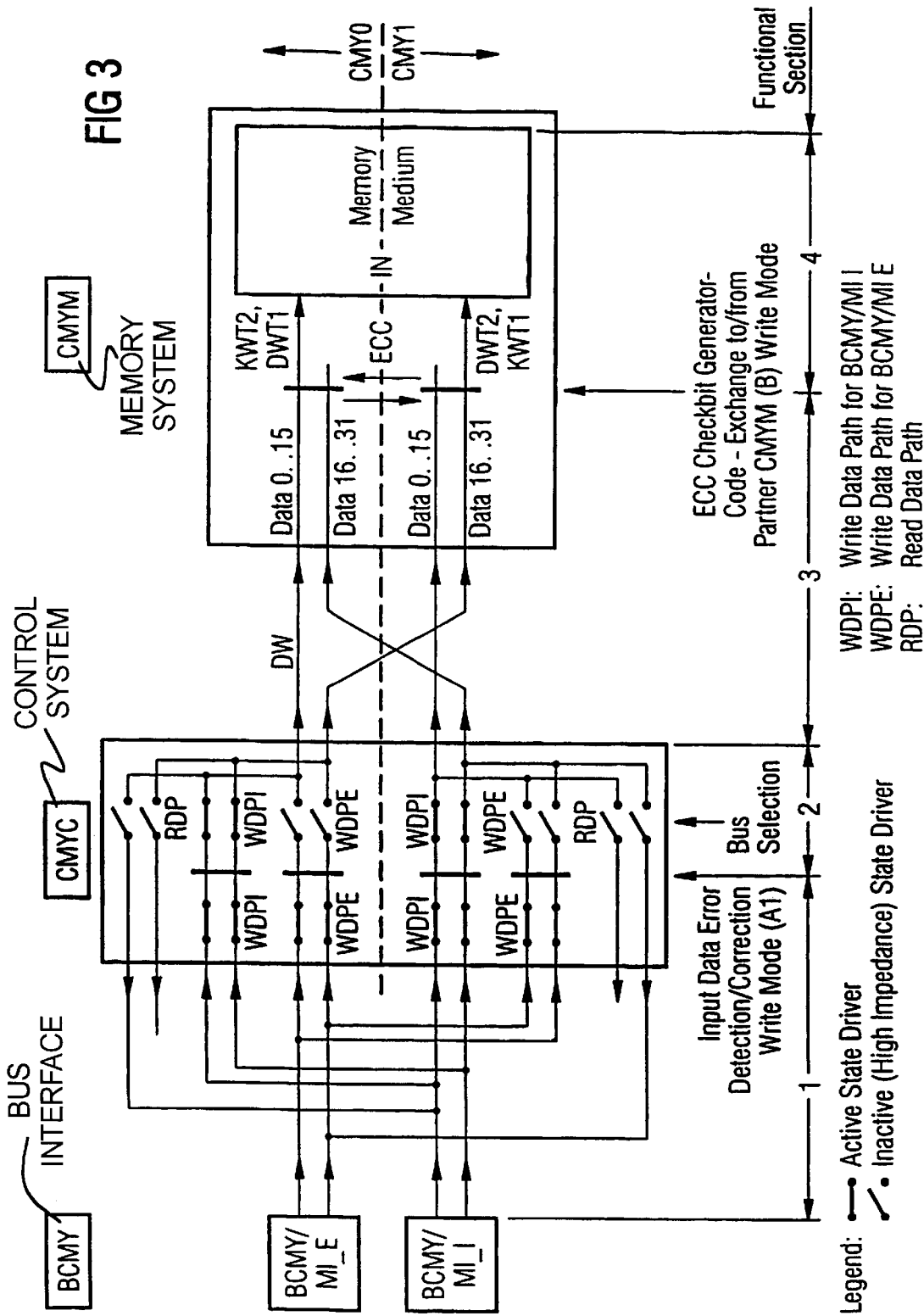

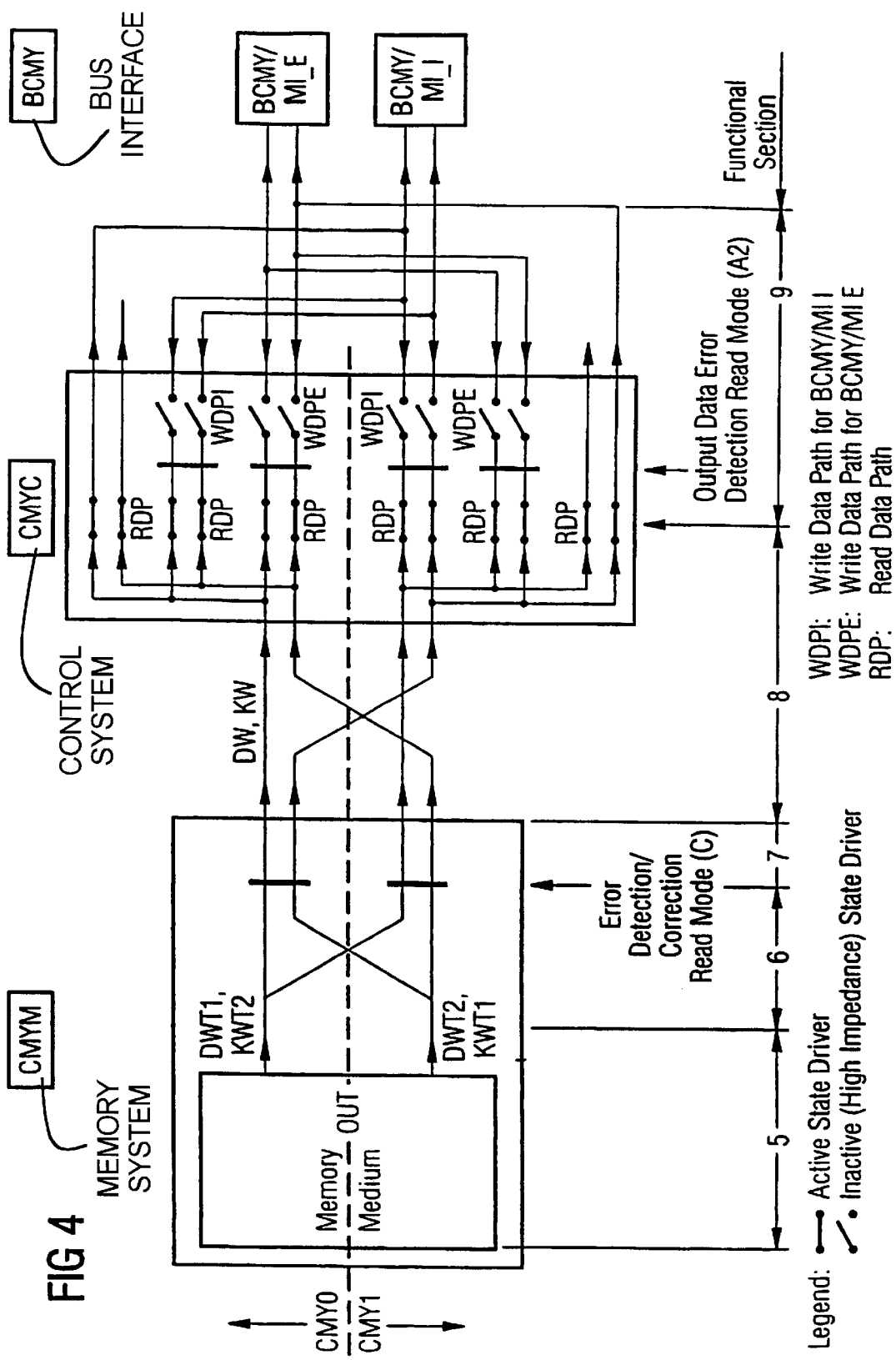

FIG 5

Data errors occurring in Section X are recognized at checkpoint Y:

| Checkpoint: Y \ Section X | 1 | 2 | 3 | 4 | 5 | 6 | 7 | 8 | 9 |
|---|---|---|---|---|---|---|---|---|---|
| A1 | X | | | | | | | | |
| B | X | X | | | | | | | |
| C | X | X | X | X | X | X | | | |
| A2 | X | X | X | X | X | X | X | X | X |

ERROR RECOGNITION IN A STORAGE SYSTEM

BACKGROUND OF THE INVENTION

The data contents of memory systems are often protected in such a way that a plurality of redundant bits are additionally co-stored under the address of a data word. These bits are called check bits, K-bits or ECC-bits and arise by forming the parity sum over specific parts of the data word, which is usually referred to as EDC coding ("EDC" abbreviated for Error Detection Code). Upon readout of the memory word, the sub-parities are formed anew and compared to the allocated K-bits that are likewise readout. When there is equality for all K-bits, then it is concluded that the readout data word is error-free. Given inequality, conclusions about the kind of error are drawn from the pattern of the non-coincidence, what is referred to as the syndrome pattern.

Those K-bit positions that do not agree in said comparison are called syndromes. Specific syndrome patterns are decoded and the falsified bit position in the data word is thus potentially determined and corrected by inverting.

The formation of the K-bits (EDC encoding), the comparison of the K-bits, the decoding of the syndromes as well as the correction and potential alarm to a higher-ranking controller currently normally ensues with the assistance of specific controller modules, which are also referred to as EDC controllers below.

When a fault is then present in the memory system that causes an uncorrectable error, that is, a multi-bit error (for example, drive error or memory bit falsification error or memory module failure), this error can in fact be recognized by the error monitoring system with high probability, but only after the readout of the faulty data. This can be very late after the occurrence of the error under certain circumstances. The negative effects of the error can already be considerable at this late point in time.

SUMMARY OF THE INVENTION

It is an object of the present invention to provide an improved memory system.

In general terms the present invention is a memory system, wherein a respective check word is co-stored together with a data word. An error monitoring system generates the check word from the data word to be written in and from he write address according to a specific formation rule, what is referred to as the EDC code before the check word in common with the data word to be written in is stored under the write address. The error monitoring system also generates a check word anew according to the EDC code on the basis of a data word to be read out from the memory system. It compares the bits of the check word (K-bits) to the K-bits stored for the data word and, given inequality, draws conclusions about the type of error from the pattern of the equal and unequal K-bits, what is referred to as the syndrome pattern. Before storing a data word to be written under its write address, an internal read even it implemented, whereby the error monitoring system implements the error check as previously described.

In one embodiment of the present invention the error monitoring system co-involves the address in the EDC coding, that is, in the formation of the check word. What is particularly avoided as a result of this embodiment is that a DW is written under an unintended address due to a drive error (for example, addressing error) that affects the entire memory word and a DW stored in this memory cell is overwritten. In a second attempt, morever, the data to be stored can be deposited under another error-free write address and are thus not lost.

In a further embodiment of the present invention at least two separately driven memory units and a respective segment of the data word together with a segment of the check word is stored in each memory unit. The EDC code is selected such that the comparison yields an odd number of unequal K-bits given a one-bit error. An even number of unequal K-bits respectively contribute to the odd number from those segments of the check word that are not stored together with that segment of the data word in which the one-bit falsification is present.

What is particularly avoided as a result of this embodiment is that a DW segment is written under an unintended address due to a drive error (for example, addressing error) that affects a memory word segment covering this DW segment and a DW segment stored in this memory cell is overwritten. In a second attempt, moreover, the data to be stored can be deposited under another error-free write address and are thus not lost.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in which:

FIG. 1 depicts tables showing bit positions in an ECD controller;

FIG. 2 depicts tables showing bit positions of address parity bits;

FIG. 3 depicts a memory system according to the present invention;

FIG. 4 depicts the configuration of data paths and check points of the memory system for a read cycle; and FIG. 5 depicts the check point at which data errors are recognized.

DESCRIPTION OF THE PREFERRED EMBODIMENTS.

With reference to what is referred to as an EDC-code table, FIG. 1 shows the bit positions over which the K-bits are formed in an EDC controller.

In FIG. 1, the character "X" denotes that the allocated data bit N ($100=<N=<31$) is involved in the parity formation for the checkbit c ($C0=<C<C7$). The character "0" next to the lines of the bottom memory word half means that the appertaining C-bit is equal to 1 when the number of "1's" involved in the parity bit formation is uneven in the entire useful bit part. The character "E" next to the lines of the bottom memory word half means that the appertaining C-bit is equal to 0 when the number of "1's" involved in the parity bit formation is uneven in the entire useful bit part. These two latter statements thus relate to both halves of the memory word together.

Data words that comprise 32 data bits are assumed in FIG. 1. Eight check bits C0, C1, C2 . . . C7 that are respectively formed by parity formation over specific bit positions of a data word are allocated to these data bits. The entire memory word, that is, the useful word (address or data) plus check word, thus covers 40 bits. These are organized in DRAM memory modules with a cell width of four bits.

Due to the check bits formed according to the EDC code tables, a one-bit error can be reliably recognized and lead to odd-numbered syndrome patterns. Further, a correction of one-bit errors can be implemented since every error bit position within a useful word has an unambiguous syndrome pattern permanently allocated to it. This syndrome pattern can be decoded and, thus, utilized for the correction of the faulty bit.

Finally, multi-bit errors can be recognized. For example, double-bit errors always lead to an even-numbered syndrome pattern unequal to 0 and are therefore reliably recognized as multi-bit errors. The other even-numbered multi-bit errors likewise always lead to an even-numbered syndrome patterns, whereby the zero syndrome arises with a probability of $1/128$ since there are a total of 128 even-numbered syndrome patterns given this ECC width (number of K-bits). These errors therefore immediately lead to multi-bit error alarm with a probability of 99.2%.

Odd-numbered multi-bit errors lead to odd-numbered syndrome patterns, whereby the syndrome patterns of 1-bit errors can also arise. These errors are therefore immediately recognized as multi-bit errors with 68.75% probability. This number arose as follows:

Given an 8-bit ECC width, there are a total of 128 odd-numbered syndrome patterns. Of these 128 patterns, 40 are reserved for 1-bit errors. 128−40=88 patterns thus remain for odd-numbered multi-bit errors. The probability that one of these patterns is encountered given an arbitrary, odd-numbered multi-bit error is thus $88/128$=68.75%.

It derives in summary that arbitrary multi-bit errors trigger an immediate alarm as multi-bit errors with a probability of $215/256$=84%. The even-numbered multi-bit errors have thereby also been taken into consideration, these, of course, causing the zero syndrome in 1 of 128 instances. This number in turn derives as follows: Given an 8-bit ECC width, there are a total of 256 syndrome patterns. Of these 256 patterns, 40 are reserved for 1-bit errors and one pattern is the zero syndrome pattern. 256 40−1=215 patterns thus remain for multi-bit errors. The probability that one of these patterns is encountered given an arbitrary multi-bit error is thus $215/256$=84%.

When an error is then present in the drive of the memory units (for example, memory modules) of the memory system that are driven in common, that is, parallel, in the context of a memory access, syndrome patterns can thus arise that simulate a correctable one-bit error and are thus not recognized as errors of the drive. Other errors are also conceivable, for example outage of the write pulse, that would not be recognizable at all via the EDC controller.

The problem can be considerably alleviated when the memory modules that are activated in common when reading is supplied by a plurality of drive signals of the same type that derive from independent drive units. In this case, one counts only on an outage of one of these signals (that is, failure of one control unit), as a result whereof, for example, data and check bits of different memory words can be mixed with one another upon readout. Despite this measure, which is referred to in short below as measure A), one-bit errors or even freedom from error can, however, still be simulated, although with lower probability.

This latter problem, however, can be prevented by skilled division of the data and check bits onto the memory units in combination with the appertaining selection of the EDC code (see FIG. 1). One can see from FIG. 1 that a segment of the check word that is not stored together with that segment of the data word in which a one-bit falsification is present (for example, the data word segment DWT1 with the check word segment KWT1) can only respectively contribute an even number to the SynPa. On the other hand, a segment of the data word that is stored together with the segment of the check word (for example, the segment DWT1 with KWT2) can only contribute an odd number to the SynPa. The latter case, however, cannot occur given errors that arise due to the incorrect drive (addressing) of a memory unit. Only even-numbered syndrome patterns can thus arise given an incorrect drive.

The skilled division of the data and check bits onto the memory units in combination with the appertaining selection of the EDC code is referred in brief below as measure B).

The general formation rule for the division given more than two storage medium units is disclosed in greater detail in German Patent Application P 35 28 902.3-31.

Due to said division of the memory word onto the storage medium units and the selection of the EDC code corresponding thereto, only even-numbered syndrome patterns can arise in instances wherein the data and check bits of a drive unit are incorrectly selected. Since correctable one-bit errors only generate odd-numbered syndrome patterns, the risk of confusing the one-bit errors with said drive errors is eliminated in this way.

Unfortunately, the errors "all 0" or "all 1" in a memory word half (=half the data plus appertaining notebooks of the C-bits) can still lead to odd-numbered syndrome patterns despite measure B) and, thus, can simulate correctable one-bit errors. In order to prevent this, the EDC code is additionally selected such that a data word segment, that is, a segment of the data word that is not stored together with another segment of the data word (for example, the segments DWT1 or, respectively, DWT2 in FIG. 1), participates in the formation of a K-bit with a respectively even plurality of bit places insofar as it is a matter of a data word segment that is not stored together with this K-bit, and participates with an odd plurality of bit places insofar as it is a matter of a data word segment that is stored together with this K-bit. Due to said selection of the EDC code, which is referred to in brief below as measure 1), the errors "all 0" or "all 1" in a memory word half ('half of the data+appertaining half of ECC bits) will always lead to odd-numbered syndrome patterns. As a result thereof, these errors are reported as multiple errors. Since the two word halves are driven by separate controllers and many control errors have the above-described effect (all 0 or all 1), distinguishing these errors from 1-bit errors is thus considerably improved.

FIG. 3 shows an inventive memory system CMY that a redundant (memory) control system CMYC, a (memory) medium system CMYM ("memory" in short) with two memory units, that is two (memory) medium halves, as well as a redundant bus interface BCMY via which the connection to the bus system of a computer system is produced.

The memory system comprises an error monitoring that, with the assistance of EDC controllers, offers different check points dependent on the machine cycle (read or write cycle).

All data paths in the CMY, that is, between MBCY and CMYM, are redundantly present and the full width of the data words (32 bits) is utilized in each data path at the check points by corresponding EDC controllers for error monitoring independently of one another.

In particular, the configuration of the data paths and check points of the memory system for a write cycle is shown in FIG. 3.

In the write cycle, the write data and appertaining K-bits coming from BCMY first proceed via write paths WDPI to a check point A1. The aforementioned error monitoring wherein bit errors (one-bit or multi-bit errors) are recognized and one-bit errors are even corrected is implemented at this check point.

Subsequently, the write data are redundantly forwarded (but without check bits) to the memory CMYM.

At check point B, that is, immediately before the write data are written into the memory, a check word is again generated from the write data in each of the two transmission halves and a comparison ECC of the two check words is implemented. The two check words are identical only when the data in both halves were processed error-free up to that point; otherwise, a multiple error, that is, an uncorrectable error, alarm is triggered. Errors that, among other things, are based on an error-affected transmission between A1 and B or are caused by fault-affected EDC networks at the check points A1 or B are found by the comparison ECC.

The check bits of control point A1 are not needed for the check point B since they are generated again from the write data at the check point B, that is, immediately before the write data are written into the medium system, and because they are not required for the error monitoring between A1 an B. The error monitoring between A1 and B, of course, is already assured already by the comparison of the two check words formed at the check point B.

The transmission path of the data between A1 and B is partially crossed out. When a selection error (drive error) is present in one transmission half, then inconsistencies arise at the check point B. This leads to the reporting of a multiple error.

When the comparison at check point B yields no inconsistencies, then the data together with check word are written into the medium system. In particular, the data bits 0 . . . 15 (DWT1) together with the K-bits 4 . . . 7 (KWT2) are thereby written into the one medium half and the data bits 16 . . . 32 (DWT2) together with the K-bits 0 . . . 3 (KWT1) are written into the other medium half.

Due to the explained section-by-section monitoring of the data paths for control errors iVm. with the exchange of the memory word halves between both controllers, the location at which the error has arisen can be derived from the combined consideration of the alarms of different EDC modules.

In order to prevent a potentially faulty write event that ensues in section 4, that is, directly at write-in, a read/write cycle is implemented instead of a pure write cycle, whereby an EDC check of the read data and, thus, a check of the drive of a memory cell ensues before a correctly driven memory cell is overwritten by the misdrive of a faulty write event. The read event thereby remains internal, that is, the BCMY does not accept the read data in order to output them onto the bus. The write data are intermediately stored in the CMYM until the end of the read check. As a result of this measure, the system effects of control errors are kept slight and the (control) error are distinguished better and recognized faster.

What this measure, combined with said measures A0 and B) effects is that errors in the selection of a memory word half (caused, for example, by addressing errors) are already recognized before the readout of the falsified memory word. Combined with measure C), this likewise applies to the addressing errors of entire memory words. The same advantage applies given multi-bit falsifications that are caused by errors within a memory module.

For reasons of clarity, the application of the EDC coding was explained only with respect to the data word up to now. In fact, however, it is not only the data word but also the memory address of the data word that is, co-involved in the EDC coding, that is, in the parity formation (see FIG. 2). The EDC code is thereby selected such with respect to the address word that only an even-numbered syndrome pattern can arise given a one-bit error in the address word. This, however, means that only an even-numbered syndrome pattern can likewise arise a multiple bit error. The reporting of a multiple error, that is, of an uncorrectable error, thus always arising given an addressing error. The involvement of the address into the EDC coding is disclosed in greater detail in Published Application DE 3319710 A1 and is referred to in brief below as measure C).

In order to minimize the outlay of the generation of the address parity bits required for measure C), an additional utilization of the data EDC modules ensues for generating the address parity bits. This becomes possible by time-division multiplex of address and data as well as formation of the address parity bits according to FIG. 2, that is, from a subset of the EDC coding of FIG. 1. As a result thereof, the condition of even-numbered per address bit required for measure C) is adhered to. The condition of even-numbered nature of specific code segments needed for measure B) is utilized therefor.

FIG. 4 shows the configuration of the data paths and check points of the memory system for a read cycle.

During the read cycle, the data word and the appertaining check word is first read out and proceeds to the check point C at which an error recognition and, as warranted, error correction is implemented. Subsequently, the data word and the check word is forwarded to the bus interface BCMY, whereby an error recognition is implemented again at the check point A2. In case of error, what this error recognition effects is that the bus interface BCMY blocks the forwarding of the data word and of the check word onto the bus. In this case, moreover, the faulty memory system half (CMY0 or CMY1) is disconnected from the bus interface BCMY.

Compared to FIGS. 3 and 4, FIG. 5 shows the check point (check point Y) at which data errors that occur in a specific section (section X) of the memory system are recognized.

Examples of specific errors and their handling by the error monitoring system now follow.

Example 1: Recognition of control errors with the EDC protection

Error case: incorrect selection of a memory word half

Means for recognition: measure A) and B)

Allocation of the bit positions:
X = selected by control 0, Y = selected by control 1
bold = faulty information part

```
31              16 15              00 C7  C4 C3  C0
YYYYYYYYYYYYYYYY|XXXXXXXXXXXXXXXX  XXXX|YYYY
```
consistent memory word under address 1:
```
31              16 15              00 C7  C4 C3  C0
0000000000000000|0000000000000000  0000|1100
```
consistent memory word under address 2:
```
31              16 15              00 C7  C4 C3  C0
1111111111111111|1111111111111110  1101|1111
```
When reading under address 2, control 0 incorrectly read out under address 1. This leads to the following read information:
```
31              16 15              00 C7  C4 C3  C0
1111111111111111|0000000000000000  0000|1111
```
The ECC bits that were formed over
readout data:                    0000 | 0011
                                 C7 C4 C3 C0

Even-numbered syndrome pattern that
arises by XOR operation of the readout
to the newly formed ECC bits     0000 | 1100
                                 S7 S4 S3 S0

This leads to the triggering of a multiple error alarm!

Example 2: Recognition of control errors with the EDC protection

Error case: a memory word half remains high-impedance

Means for recognition: measure 1)

Allocation of the bit positions:
X = selected by control 0, Y = selected by control 1
bold = faulty information part

```
31              16 15              00 C7  C4 C3  C0
YYYYYYYYYYYYYYYY|XXXXXXXXXXXXXXXX  XXXX|YYYY
```
consistent memory word under address 1:
```
31              16 15              00 C7  C4 C3  C0
1010101010100010|1010101010101010  0000|0011
```
When reading under address 1, control 1 incorrectly did not switch the appertaining data and ECC outputs low-impendance. This leads to the following read information:
```
31              16 15              00 C7  C4 C3  C0
1111111111111111|1010101010101010  0000|1111
```
The ECC bits that were formed over
readout data:                    0011 | 0011
                                 C7 C4 C3 C0

Even-numbered syndrome pattern that
arises by XOR operation of the readout
to the newly formed ECC bits     0011 | 1100
                                 S7 S4 S3 S0

This leads to the triggering of a multiple error alarm!

Example 3: recognition of memory word addressing errors

Error case: addressing error (simple error) to memory cell with identical data content Means for recognition: measure C), that is, the physical address was co-involved into the formation of the ECC bits (see FIG. 2)

consistent memory word under address

B'111010101010101000:
ECC bits gen. only from the data       :1111 | 0011
par. bits generated from the adr.      :0110 | 0101
ECC resulting by XOR formation         :1001 | 0110 overall memory word:
```
1010101010101010|1010101010101010  1001|0110
31              16 15              00 C7  C4 C3  C0
```
consistent memory word under address
B'101010101010101000:
ECC bits gen. only from the data       :1111 | 0011
par. bits generated from the adr.      :1010 | 0101
ECC resulting by XOR formation         :0101 | 0110 overall memory word:
```
1010101010101010|1010101010101010  0101|0110
31              16 15              00 C7  C4 C3  C0
```

Given the intended readout under address
B'111010101010101000,
readout erroneously occurred under address
B'101010101010101000.

This leads to the following read information:
```
31              16 15              00 C7  C4 C3  C0
1010101010101010|1010101010101010  1101|1111
```

Regenerating the ECC bits:
                                       C7 C4 C3 C0
ECC bits gen. only from the data       :1111 | 0011
par. bits generated from the adr.      :0110 | 0101
ECC resulting by XOR formation         :1001 | 0110

Even-numbered syndrome pattern that
arises by XOR operation of the read
with the newly formed ECC bits         :1100 | 0000
                                       S7 S4 S3 S0

It leads to the triggering of a multiple error alarm!

Example 4: recognition of memory word addressing errors

Error case: addressing error (multiple error) to memory cell with different data content Means for recognition: measure C), that is, the physical address was co-involved into the formation of the ECC bits (see FIG. 2)

consistent memory word under address

B'111010101010101000:
ECC bits gen. only from the data       :1111 | 0011
par. bits generated from the adr.      :0110 | 0101
ECC resulting by XOR formation         :1001 | 0110 overall memory word:
```
1010101010101010|1010101010101010  1001|0110
31              16 15              00 C7  C4 C3  C0
```
consistent memory word under address
B'111011101110001000:
ECC bits gen. only from the data       :0000 | 0011
par. bits generated from the adr.      :0110 | 1001
ECC resulting by XOR formation         :0110 | 1010 overall memory word:
```
1111111111111111|0000000000000000  0110|1010
31              16 15              00 C7  C4 C3  C0
```

When reading under address
111010101010101000,
readout erroneously occurred under address
111011101110001000.

This leads to the following read information:

```
1111111111111111 | 0000000000000000  0110 | 1010
31             16 15              00  C7 C4 C3 C0
```

Regenerating the ECC bits:

| | |
|---|---|
| ECC bits gen. only from the data | :0000 \| 0011 |
| par. bits generated from the adr. | :0110 \| 0101 |
| ECC resulting by XOR formation | :0110 \| 0110 |
| Even-numbered syndrome pattern that arises by XOR operation of the read with the newly formed ECC bits | :0000 \| 1100 |
| | S7 S4 S3 S0 |

It leads to the triggering of a multiple error alarm!

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A memory system, wherein a respective check word is co-stored together with a data word, comprising:
   an error monitoring system that
   a) generates said check word from a data word to be written in and from a write address according to a predetermined formation rule, the formation rule being an EDC code before the check word in common with the data word to be written in is stored under said write address, and that
   b) generates a check word anew according to the EDC code based on a data word to be read out from the memory system, compares bits of the check word to K-bits stored for the data word and, given inequality, draws conclusions about a type of error from a pattern of equal and unequal K-bits, what is referred to as the syndrome pattern; and
   an internal read event that is implemented before storing a data word to be written under its write address, whereby the error monitoring system implements the error check according to feature b).

2. The memory system according to claim 1, wherein the error monitoring system co-involves the address in the EDC coding, that is, in the formation of the check word.

3. The memory system according to claim 1, wherein the system further comprises at least two separately driven memory units and a respective segment of the data word together with a segment of the check word is stored in each memory unit, and wherein the EDC code is selected such that said comparison yields an odd number of unequal K-bits given a one-bit error, whereby an even number of unequal K-bits respectively contribute to the odd number from segments of the check word that are not stored together with a segment of the data word in which the one-bit falsification is present.

* * * * *